United States Patent [19]

King et al.

[11] 3,959,541

[45] May 25, 1976

[54] COMPOSITE LAMINATE INSULATING BODY

[75] Inventors: Walter C. King, Pittsburgh; Richard J. Medvid, Natrona Heights, both of Pa.

[73] Assignee: Pittsburgh Corning Corporation, Pittsburgh, Pa.

[22] Filed: Dec. 20, 1971

[21] Appl. No.: 209,920

[52] U.S. Cl. ............................... 428/36; 428/251; 428/257; 428/304; 428/310; 428/312; 428/332

[51] Int. Cl.² ..................... B32B 7/00; B32B 15/00; B32B 17/00; B32B 19/00

[58] Field of Search .............. 161/159, 93; 428/251, 428/257, 304, 310, 312, 332, 36

[56] References Cited
UNITED STATES PATENTS

| | | | |
|---|---|---|---|
| 2,641,561 | 6/1953 | Black | 161/93 |
| 3,325,341 | 6/1967 | Shannon | 161/159 |
| 3,506,534 | 4/1970 | Finan | 161/159 |
| 3,546,061 | 12/1970 | Kraemer et al. | 161/159 |
| 3,614,967 | 10/1971 | Royston | 161/93 |

*Primary Examiner*—Marion E. McCamish
*Attorney, Agent, or Firm*—Stanley J. Price, Jr.

[57] ABSTRACT

A preformed laminate insulating body including an inner layer of a substantially rigid cellular ceramic or siliceous insulating material positioned adjacent the surface to be insulated, a layer of reinforcing material adhesively secured thereto by a bonding agent, and an outer layer of similar cellular ceramic or siliceous insulating material preferably having a thickness less than 2 inches. The reinforcing layer limits cracks and fissures in the first layer of cellular insulating material, caused by thermal stress, from propagating through the outer layer of cellular insulating material; and even though some cracks and fissures do occur in the outer layer of insulating material, the reinforcing layer bonds the two layers of insulating material so securely that the integrity and the insulating property of the laminate body are preserved.

12 Claims, 4 Drawing Figures

COMPOSITE LAMINATE INSULATING BODY

BACKGROUND OF THE INVENTION

1. Field of the Invention

This invention relates to an insulating composition, more particularly, to a preformed composite laminate insulating body formed of layers of cellular ceramic or siliceous material adhesively secured to a layer of reinforcing material.

2. Description of the Prior Art

Various insulation materials have been used in the past for preventive flow of heat to or from an insulated body. Special problems are encountered when the heat source is kept in the temperature range 800° to 1500°F. as is common in steam pipes. In this temperature range, conventional insulating materials, such as wood or cork, are ineffective.

Composite insulating materials have been suggested to overcome the difficulties of providing an insulating material which retains its insulating ability when subjected to temperatures in the range 800° to 1500°F. Positioning a thermoplastic structure surrounded by a rigid foam around a pipe, then passing a heated fluid through the pipe to melt the thermoplastic and providing an air plenum surrounding the pipe is disclosed in U.S. Pat. No. 3,418,399. A core of cellular material such as a cellular glass, encased by a skin of high temperature resinous material may be used to insulate a pipe, as taught in U.S. Pat. No. 3,157,204.

When composite insulating materials are subjected to temperatures in the range 800° to 1500°F., small cracks or fissures form in the cellular insulating layer adjacent the heat source. The cracks permit heat to flow with decreased resistance through this first layer of insulation, thus decreasing the insulating ability of the composite material. When excessive thermal stress is encountered, e.g., exposure to very high temperatures or to cyclic heating between low and high temperatures, the insulating layer adjacent the heat source may fracture into small sections. Stresses then develop within the layer of insulating material adjacent the fractured layer due to increased heat transfer through the inner layer and the resultant stresses are sufficient to propagate fracture or deformation of the second layer of the composite material, with further reduction of insulating efficiency.

It is known to form an insulating material comprising a plurality of alternate layers of thin precracked ceramic materials, as taught in U.S. Pat. No. 3,528,400. The ceramic body is formed by building up alternate single thicknesses of two desired ceramic compositions, drying each layer, and firing the composite. Although the article thus formed is capable of resisting body deformation caused by thermal stresses from temperatures to 1800°F., the complicated procedure required to form such a material limits its application.

This invention provides an improved composite laminate insulating material which maintains its integrity and insulating ability even when the inner layer adjacent the heat source and the outer layer develop fractures due to thermal stresses. The invention further provides an economical insulation material of the type described having a long useful life over a temperature range of from 300°F. to 1000°F. Additionally, the invention provides a composite laminate insulating material that may be rapidly and economically fabricated.

Other advantages and details of the invention will be more completely disclosed and described as this specification proceeds.

SUMMARY OF THE INVENTION

We have discovered a composite laminate insulating material which retains its insulating ability even when the component layers have fractured under excessive thermal stress. The insulating material is comprised of layers of a substantially rigid cellular ceramic of siliceous material with a layer of insulating material, preferably a woven glass fiber reinforcing material sandwiched therebetween. The reinforcing layer of insulating material sandwiched between the layers of rigid cellular materials prevents the cracks or fissures, formed within the ceramic layer adjacent the heat source from propagating into the outer layer and limits their formation in the outer layer of material. The glass fiber insulating and reinforcing layer also maintains the integrity of the fractured pieces in contact with the body to be insulated sustaining the insulation ability of the fractured layer and hence of the composite body.

In a most preferred instance, a composite laminate insulating material is provided comprising inner and outer layers of a substantially rigid cellular glass with the outer layer having a thickness of less than 2 inches. The inner and outer layers are adhesively secured to a layer of woven glass fiber insulating and reinforcing material sandwiched therebetween. Preferably, the adhesive bond is provided by a quick setting inorganic adhesive, most preferably a calcium sulfate adhesive.

A process is provided for forming a composite laminate insulating material including the steps of preshaping a layer of cellular ceramic material to fit the surface to be insulated, preshaping a layer of glass fiber reinforcing material to fit such surface, adhesively securing said layer of cellular ceramic material to the inner surface of said reinforcing layer by use of a bonding agent, and adhesively securing a second cellular ceramic layer to the outer surface of said reinforcing layer.

Other advantages and details of the invention will become apparent by reference to the appended drawings and as the following more detailed description thereof proceeds.

DESCRIPTION OF THE PREFERRED EMBODIMENTS

Figure 2:
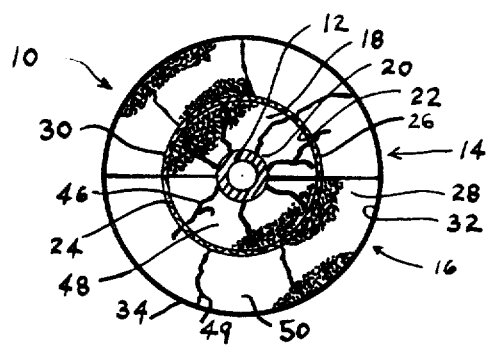
FIG. 2 is a view in section taken along the line II—II of FIG. 1 illustrating the fissures formed in the inner layer of cellular ceramic insulation and the manner in which the reinforcing layer limits the formation of fissures in the outer layer of cellular ceramic insulation.
Figure 1:
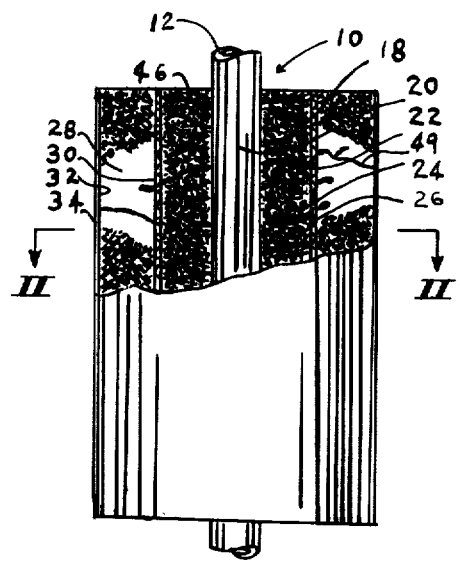
FIG. 1 is a view in elevation of cylindrical pipe insulation formed from our improved composite laminate insulating material with a portion broken away to illustrate the structure of the insulating material.

FIGS. 1 and 2 illustrate the basic construction of the laminate insulating material of this invention as a pipe covering. The numeral 10 generally refers to the cylindrical composite insulating body that encapsulates a pipe 12. The composite laminate insulating material 10 has a cylindrical configuration formed in semicylindrical parts 14 and 16 that are suitably secured to each other around the pipe 12. The semicylindrical halves 14 and 16 are of similar construction and each includes an inner layer 18 of rigid cellular ceramic material such as cellular glass having a low coefficient of thermal conductivity and a low density.

The inner cellular layer 18 has an inner semicylindrical surface 20 and an outer semicylindrical surface 22. The inner semicylindrical surface 20 has substantially the same configuration as the outer surface of the pipe 12 and is arranged to be positioned in abutting relation with the outer surface of the pipe. The semicylindrical inner cellular layer 18 may be formed in a conventional manner by cutting and shaping the semicylindrical layer 18 from a block of cellular glass.

A glass fiber insulating and reinforcing layer 24 is precut to conform to the outer surface 22 of the inner cellular layer 18 and is positioned in overlying relation with the inner cellular layer outer surface 22. A bonding agent is applied to the outer surface 26 of the glass fiber reinforcing layer 24 by any conventional method as by spraying or brushing a slurry of the bonding agent onto the surface.

An outer layer of cellular ceramic material 28 is shaped in a similar manner and has an inner semicylindrical surface 30 and an outer semicylindrical surface 32. The inner semicylindrical surface 30 has substantially the same configuration as the outer surface 22 of inner cellular layer 18. The outer semicylindrical layer 28 is positioned with the inner surface 30 in overlying relation with the glass fiber reinforcing layer outer surface 26. A pressure is applied to the outer layer 28 to displace the air between the glass fiber reinforcing layer 24 and the adjacent surfaces 22 and 30 of the inner and outer cellular layers 18 and 28. The bonding agent thus secures the inner cellular ceramic layer 18 to the glass fiber reinforcing layer 24 and the outer cellular ceramic layer 28 to the glass fiber reinforcing layer 24.

The semicylindrical halves 14 and 16, after assembly as above described, may be positioned around the pipe 12 and secured thereto by a suitable cylindrical outer covering 34. The laminate insulating material 10 thus surrounds and insulates the pipe 12.

Figure 3:
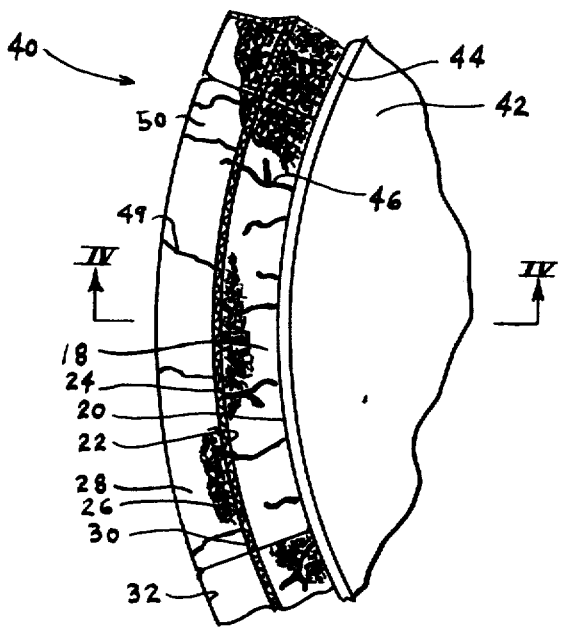
FIG. 3 is a plan view in section of a portion of the laminate insulating material shaped to insulate a large diameter tank.
Figure 4:
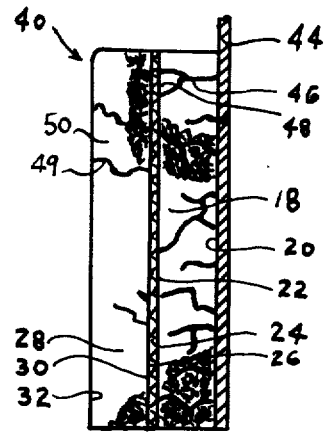
FIG. 4 is a view in section taken along the line IV—IV of FIG. 3, again illustrating the manner in which the reinforcing layer limits the formation of fissures in the outer layer of cellular ceramic insulation.

Referring to FIGS. 3 and 4 there is illustrated the composite laminate insulating body generally designated by the numeral 40 that surrounds a relatively large diameter tank 42 having an outer cylindrical metallic wall 44. The composite laminate insulating body 40 has substantially the same inner and outer cellular insulating layers with the glass fiber reinforcing layer therebetween as the previously laminate insulating material 10 and similar numerals are intended to designate similar parts of the composite laminate insulating body 40.

The inner and outer layers of cellular ceramic insulating material are precut or preshaped from a block of cellular ceramic material as, for example, cellular glass manufactured and sold by Pittsburgh Corning Corporation. Although the embodiments illustrate arcuate layers for use with pipe covering and cylindrical tank insulating, it should be understood that the composite laminate insulating body may also be formed as generally rectangular blocks or other configurations useful for insulating bodies of different shapes.

The preferred bonding agent comprises a totally inorganic quick setting adhesive such as calcium sulfate (gypsum) cement. A suitable gypsum cement is that manufactured by the U.S. Gypsum Company and sold under the trade name "Hydrocal A-11" which is obtained as a powder having a size less than 200 mesh Tyler Standard screen. The bonding agent comprises $CaSO_4 \cdot 1/2\ H_2O$. The pulverulent bonding agent is preferably mixed with water on a weight basis of about 2.2 parts dry powder to 1 part of water to form a slurry. The slurry is applied to a thickness of about 33 lbs. of slurry per 100 sq. ft. of cellular ceramic insulation. Other cements such as "Hydrocal B-11", gypsum plaster and plaster of paris have also been found suitable.

The glass fiber reinforcing layer 26 preferably comprises a relatively thin mat having a nominal thickness of less than ¼ inch. The glass fiber reinforcing layer perferably comprises a scrim fabric with a "Leno-Type" weave. A suitable glass fiber fabric is manufactured by the J. P. Stevens & Company designated "No. 1659 Scrim Fabric." The glass fiber has a thread count of 20 warp and 10 fill, a weight of 1.65 oz. per sq. yd. and a thickness of 0.004 in. The fabric has no organic binders and coatings.

It has been found that randomly woven glass fibers admixed with a bonding agent and applied as a reinforcing layer have proven unsuitable for resisting thermal stresses exerted by the cellular layers 18 and 28. Other suitable woven glass fiber fabrics include fabrics having a plain weave with a thread count of 20 × 20 and a "Leno-Type" weave with a thread count of 10 warp ×10 fill. The glass fiber fabrics having both a plain and "Leno-Type" weave are relatively uniformly woven mats and are relatively thin.

Both the inner insulating layer 18 and the outer insulating layer 28 comprise a cellular ceramic material. One suitable cellular ceramic material is cellular glass formed by mixing pulverulent glass particles with a cellulating agent and forming a cellulatable glass batch as described in U.S. Pat. No, 3,354,024 assigned to the assignee herein. The formulated glass may comprise, for example, conventional soda lime or borosilicate glass in crushed cullet form and the cellulating agent may comprise a carbonaceous material such as carbon black and the like. Other suitable materials formed of cellulatable siliceous compositions are disclosed in U.S. Pat. No. 3,441,369 also assigned to the present assignee.

The cellulatable glass batch is placed in a mold as, for example, a generally rectangular mold, and is heated to cellulating temperature. Here the formulated glass particles soften and coalesce and the cellulating agent reacts to generate a gas and form individual closed cells within the block of cellular glass. The blocks of cellular glass are removed from the molds and annealed. Thereafter the particular configurations for the inner and outer layers 18 and 28 are cut or shaped from the blocks.

It is preferred that the thickness of the outer layer be less than 2 in. The inner layer may have varying thicknesses, dependent upon the degree of insulation desired. It has been found where the outer layer 28 has a thickness greater than 2 in. fissures may develop within the inner layer adjacent to the reinforcing layer, resulting in loss of the integrity and insulating property of the laminate body.

The Figures disclose in detail a portion of the laminar insulating material that has been subjected to thermal stress, i.e., temperatures of about 1,000°F. Cracks or fissures 46 have developed in the inner cellular layer 18 adjacent the heat producing body 12 in FIGS. 1 and 2 and the cylindrical sidewall 44 in FIGS. 3 and 4. Such cracks or fissures produce several undesirable effects in conventional insulating material. The cracks 46 may extend throughout the thickness of the material, increasing the thermal conductivity through the fissures as compared with the thermal conductivity of unitary insulating material. Where the conventional insulating material has a resinous plastic coating, heat is transferred through the cracks or fissures and the plastic coating melts.

It has also been found when the cracks or fissures occur extensively throughout the insulating layer, the layer fragments into many small segments and loses its unitary structure thereby becoming ineffective as an insulating material.

Limited cracks 49 that occur in the outer layer are not direct propagations of the cracks that occur in the inner layer. The reinforcing layer bonds the two layers of insulation material so securely that none of the cracks open up.

With our improved composite laminate insulating material, the heat transfer from the heat source 12 or 44 increases the temperature within the "hot" or inner cellular insulating layer 18. When the inner cellular layer 18 is subjected to a temperature in the range of 800° to 1,000°F. the cellular ceramic insulating material is subjected to thermal stresses and radial cracks or fissures occur due to thermal stresses caused by the high temperature. The cracks or fissures 46 and 49 form throughout the thickness of the inner cellular layer 18 and in a limited amount in the outer cellular layer 28 and form discrete fragments 48 and 50. The fragments or segments 48 and 50 formed by the adjacent fissures 46 and 49 remain bonded to the glass fiber reinforcing layer 24 and the integrity of the inner and outer cellular layers is maintained.

The following examples illustrate the improved properties of the previously described composite cellular ceramic insulating body.

EXAMPLE 1

A foamed cellular glass material commerically available from Pittsburgh Corning Corporation under the tradename "Foamglas" was chosen as the cellular insulating material. The cellular glass has a density of approximately 9 lbs. per cu. ft. and a thermal conductivity of about 0.40 B.t.u. per hr. per sq. ft. per deg. F. per in. at a temperature of 72°F. This material is corrosion resistant, water impervious and capable of resisting thermal stress exerted by temperatures as high as 800°F.

Two semicylindrical segments of cellular glass were preshaped with an arcuate inner dimension substantially equal to the outer dimension of the body desired to be insulated. The segments were joined lengthwise using "Hydrocal A-11" gypsum cement as a slutty formed of 2.2 parts "Hydrocal A-11" and 1 part water by weight to form a cylinder of cellular ceramic material. The cement slurry was next evenly applied to the outer surface of the cylinder of cellular ceramic material. J. P. Stevens & Company woven glass fiber "Scrim Fabric" No. 1659, 0.004 inches thick, was cut to substantially the length and surface dimensions of the ceramic cylinder and applied in place thereon. Pressure applied to the glass fiber secured it to the ceramic cylinder.

The gypsum cement was applied evenly to the surface of the glass fiber thus secured and to a second pair of cellular ceramic segments appropriately prehaped with inner semicylindrical dimensions substantially equal to the outer semicylindrical dimensions of the insulated body formed to this point. The semicylindrical segments were than brought into contact with the cement coated surface of the glass fiber reinforcing layer. Sufficient pressure was applied to securely bond the outer cellular cylinder to the inner cellular cylinder and the glass fiber reinforcing material therebetween.

After setting, the composite laminate insulating material thus formed was subjected to thermal stress by contacting the inner surface of the inner cellular cylinder with a heated rod of substantially the same outer diameter and maintained at 1000°F. The heated rod was allowed to remain in contact with the composite insulating body for 24 hours.

At the close of the heating period, it was noted that small cracks or fissures had formed throughout the thickness of the first cellular ceramic layer and to a lesser amount in the outer cellular ceramic layer. The cracks in the outer layer were not direct propagations of the cracks in the inner layer. The composite insulating body of this invention thus retained its insulating ability even when cracks occurred under thermal stress.

EXAMPLE 2

Using the foamed cellular ceramic material of Example I, rectangular blocks were formed having a five inch square cross section. A one and one half inch lengthwise slice was cut therefrom. The pieces were rejoined having a No. 1659 glass fiber "Scrim Fabric" adhesively disposed therebetween as previously described in Example I for forming an insulating laminate body according to the invention. The composite body was allowed to stand at room temperature for thirty minutes after which it was possible to slice the body into pieces of desired thicknesses, e.g., from 2½ to 5 inches for use. The laminate insulating body was found to have excellent insulating properties and resistance to thermal stress at temperatures to 1000°F.

The composite insulating bodies formed and tested as described in Examples I and II retained their unitary structures even when both ceramic layer cracked under thermal stress. The bodies thus formed could, therefore, be removed and reused as insulating devices by applying them directly to the surfaces to be insulated. Such composite insulating devices could be formed and subjected to thermal stress at one installation and then stripped or removed and installed at a different location while maintaining the integrity of the insulating devices.

According to the provisions of the Patent Statutes, the principal, preferred construction and mode of operation of the invention have been explained and described as have what is now considered to represent its best embodiments. It should be expressly understood, however, that the invention is not necessarily limited to the particular embodiments disclosed therein, but may be variously practiced within the scope of the following claims:

We claim:
1. A composite laminate insulating body comprising, an inner layer of a substantially rigid cellular ceramic insulating material arranged to be positioned adjacent the surface of a body to be insulated, an outer layer of substantially rigid cellular ceramic insulating material, and a layer of uniformly woven glass fiber insulating and reinforcing material having a thickness less than ¼ inch and a thread count of between about 20 and 10 warp and between about 20 and 10 fill, said layer of said uniformly woven glass fiber disposed between said inner and outer layers of cellular insulating material, said layers being adhesively secured to one another by use of a bonding agent and said composite insulating body characterized by resistance of thermal stress at temperatures to 1000°F, said layer of reinforcing material limiting cracks formed in said inner layer of cellular insulating material adjacent said surface to be insulated due to excessive thermal stress from propagating directly through said outer layer of cellular insulating material and maintaining the integrity of the fractured pieces of said inner layer of cellular insulating material with said surface to be insulated.

2. The preshaped composite laminate insulating body as set forth in claim 1 wherein, said layer of reinforcing material comprises a glass fiber insulating material.

3. The preshaped composite laminate insulating body as set forth in claim 1 wherein, said inner and outer layers of cellular insulating material are formed of a composition selected from cellulatable ceramic and siliceous compositions.

4. The preshaped composite laminate insulating body as set forth in claim 1 wherein, said inner and outer layers of cellular insulating material comprise a cellular glass composition.

5. The preshaped composite laminate insulating body as set forth in claim 4 wherein, said outer layer of cellular ceramic material has a thickness of less than 2 inches.

6. The preshaped composite laminate insulating body as set forth in claim 1 wherein, said bonding agent comprises an inorganic, quick setting cement.

7. The preshaped composite laminate insulating body as set forth in claim 6 wherein, said bonding agent comprises a gypsum cement.

8. The preshaped composite laminate insulating body as set forth in claim 7 wherein, said bonding agent comprises an aqueous mixture of $CaSO_4.2H_2O$.

9. A composite laminate insulating body as set forth in claim 1, in which, said layer of uniformly woven glass fiber having a thickness of about 0.004 inches.

10. A composite laminate insulating body as set forth in claim 1, in which, said layer of uniformly woven glass fiber insulating and reinforcing material is a fabric having a weight of about 1.65 oz. per square yard and a thread count of about 20 warp and 10 fill.

11. A composite laminate insulating body as set forth in claim 1, in which, said layer of uniformly woven glass fiber insulating and reinforcing material is a fabric having a plain weave with a thread count of 20 warp and 20 fill.

12. A composite laminate insulating body as set forth in claim 1, in which, said layer of uniformly woven glass fiber insulating and reinforcing material is a fabric having a plain weave with a thread count of about 20 warp and 10 fill.

* * * * *